(12) United States Patent
Cooke et al.

(10) Patent No.: US 11,686,888 B1
(45) Date of Patent: *Jun. 27, 2023

(54) OPTICAL LENS ASSEMBLIES, HEAD-MOUNTED DISPLAYS, AND RELATED METHODS

(71) Applicant: META PLATFORMS TECHNOLOGIES, LLC, Menlo Park, CA (US)

(72) Inventors: John Cooke, Bothell, WA (US); Katherine Marie Smyth, Seattle, WA (US); Andrew John Ouderkirk, Kirkland, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 213 days.

This patent is subject to a terminal disclaimer.

(21) Appl. No.: 17/180,194

(22) Filed: Feb. 19, 2021

Related U.S. Application Data

(63) Continuation of application No. 16/021,580, filed on Jun. 28, 2018, now Pat. No. 10,928,558.
(Continued)

(51) Int. Cl.
*G02B 3/14* (2006.01)
*G02C 7/06* (2006.01)
(Continued)

(52) U.S. Cl.
CPC ............... *G02B 3/14* (2013.01); *G02B 3/12* (2013.01); *G02B 26/06* (2013.01);
(Continued)

(58) Field of Classification Search
None
See application file for complete search history.

(56) References Cited

U.S. PATENT DOCUMENTS

| 60,109 A | 11/1866 | Woodward |
| 3,571,555 A | 3/1971 | Townes et al. |
| (Continued) | | |

FOREIGN PATENT DOCUMENTS

| KR | 10-2011-0107812 A | 10/2011 |
| KR | 101675093 B1 | 11/2016 |
| (Continued) | | |

OTHER PUBLICATIONS

Non-Final Office Action received for U.S. Appl. No. 16/013,837 dated Jan. 23, 2020, 22 pages.
(Continued)

*Primary Examiner* — Jennifer D. Carruth
(74) *Attorney, Agent, or Firm* — Greenberg Traurig, LLP

(57) ABSTRACT

The disclosed optical lens assemblies may include a deformable element, a structural support element, a substantially transparent deformable medium positioned between the deformable element and the structural support element, a compliant peripheral component positioned between peripheral portions of the deformable element and the structural support element, and an actuator configured to displace at least a portion of the compliant peripheral component to deform the deformable element and change at least one optical property of the optical lens assembly. Related head-mounted displays and methods of fabricating such optical lens assemblies are also disclosed.

20 Claims, 12 Drawing Sheets

Related U.S. Application Data

(60) Provisional application No. 62/650,254, filed on Mar. 29, 2018.

(51) Int. Cl.
    *G02B 27/01*         (2006.01)
    *G02B 26/06*         (2006.01)
    *G02B 3/12*          (2006.01)
    *G02F 1/1362*       (2006.01)
    *G02B 26/08*         (2006.01)

(52) U.S. Cl.
    CPC ....... *G02B 26/0875* (2013.01); *G02B 27/017* (2013.01); *G02B 27/0172* (2013.01); *G02C 7/06* (2013.01); *G02F 1/136277* (2013.01); *G02B 2027/011* (2013.01); *G02B 2027/0107* (2013.01); *G02B 2027/0178* (2013.01)

(56) References Cited

U.S. PATENT DOCUMENTS

| | | | |
|---|---|---|---|
| 3,797,922 | A | 3/1974 | Plummer |
| 4,477,158 | A | 10/1984 | Pollock et al. |
| 5,154,862 | A | 10/1992 | Reagan et al. |
| 5,225,244 | A | 7/1993 | Aharoni et al. |
| 5,663,779 | A | 9/1997 | Karasawa |
| 5,956,183 | A | 9/1999 | Epstein et al. |
| 6,081,388 | A | 6/2000 | Widl |
| 6,420,441 | B1 | 7/2002 | Allen et al. |
| 6,918,670 | B2 | 7/2005 | Blum et al. |
| 7,008,054 | B1 | 3/2006 | Kurtin et al. |
| 7,118,219 | B2 | 10/2006 | Itagaki |
| 7,125,508 | B2 | 10/2006 | Ide et al. |
| 7,864,440 | B2 | 1/2011 | Berge |
| 7,866,816 | B2 | 1/2011 | Kurtin |
| 8,210,678 | B1 | 7/2012 | Farwig |
| 8,441,737 | B2 | 5/2013 | Buch et al. |
| 9,292,085 | B2 | 3/2016 | Bennett et al. |
| 10,187,568 | B1 | 1/2019 | Tran et al. |
| 10,409,089 | B2 | 9/2019 | Pugh et al. |
| 10,698,224 | B1 | 6/2020 | Cooke et al. |
| 10,754,145 | B1 | 8/2020 | Ouderkirk et al. |
| 10,881,287 | B1 | 1/2021 | Ouderkirk et al. |
| 10,928,558 | B1 * | 2/2021 | Cooke .................. G02B 26/06 |
| 10,928,656 | B1 | 2/2021 | Smyth et al. |
| 10,962,791 | B1 | 3/2021 | Ouderkirk et al. |
| 11,011,739 | B1 | 5/2021 | Ouderkirk et al. |
| 11,048,075 | B1 | 6/2021 | Ouderkirk et al. |
| 2003/0003295 | A1 | 1/2003 | Dreher et al. |
| 2003/0054115 | A1 | 3/2003 | Albano et al. |
| 2003/0067245 | A1 | 4/2003 | Pelrine et al. |
| 2003/0083433 | A1 | 5/2003 | James et al. |
| 2003/0128496 | A1 | 7/2003 | Allen et al. |
| 2004/0096672 | A1 | 5/2004 | Lukas et al. |
| 2006/0024976 | A1 | 2/2006 | Waldfried et al. |
| 2006/0073424 | A1 | 4/2006 | Koveshnikov et al. |
| 2006/0228092 | A1 | 10/2006 | Hebrink et al. |
| 2006/0247404 | A1 | 11/2006 | Todd |
| 2007/0035839 | A1 | 2/2007 | Ibuki |
| 2008/0038561 | A1 | 2/2008 | Yoshizawa et al. |
| 2008/0049431 | A1 | 2/2008 | Boek et al. |
| 2008/0084532 | A1 | 4/2008 | Kurtin |
| 2008/0088793 | A1 | 4/2008 | Sverdrup et al. |
| 2008/0123049 | A1 | 5/2008 | Volk |
| 2008/0144185 | A1 | 6/2008 | Wang et al. |
| 2008/0170299 | A1 | 7/2008 | Kawabata |
| 2008/0171431 | A1 | 7/2008 | Yu et al. |
| 2008/0290435 | A1 | 11/2008 | Oliver et al. |
| 2008/0291394 | A1 | 11/2008 | Ishak |
| 2009/0015786 | A1 | 1/2009 | Harris |
| 2009/0027778 | A1 | 1/2009 | Wu et al. |
| 2009/0096106 | A1 | 4/2009 | Vrtis et al. |
| 2009/0289529 | A1 | 11/2009 | Ito et al. |
| 2009/0304924 | A1 | 12/2009 | Gadgil |
| 2010/0075056 | A1 | 3/2010 | Axisa et al. |
| 2010/0109486 | A1 | 5/2010 | Polyakov et al. |
| 2010/0168409 | A1 | 7/2010 | Fujita |
| 2010/0202054 | A1 | 8/2010 | Niederer |
| 2010/0238400 | A1 | 9/2010 | Volk |
| 2011/0075096 | A1 | 3/2011 | Ishak et al. |
| 2011/0085131 | A1 | 4/2011 | Gupta et al. |
| 2011/0096411 | A1 | 4/2011 | Henriksen et al. |
| 2011/0149410 | A1 | 6/2011 | Blum |
| 2011/0176105 | A1 | 7/2011 | Harris |
| 2011/0179861 | A1 | 7/2011 | Grange et al. |
| 2011/0235326 | A1 | 9/2011 | Yeh et al. |
| 2011/0294305 | A1 | 12/2011 | Jacobs et al. |
| 2012/0029416 | A1 | 2/2012 | Parker et al. |
| 2012/0032559 | A1 | 2/2012 | Hino et al. |
| 2012/0041553 | A1 | 2/2012 | Gupta et al. |
| 2012/0044571 | A1 | 2/2012 | Mukawa |
| 2012/0063000 | A1 | 3/2012 | Batchko et al. |
| 2012/0087015 | A1 | 4/2012 | Nibauer et al. |
| 2012/0092775 | A1 | 4/2012 | Duston et al. |
| 2012/0170920 | A1 | 7/2012 | Moreau et al. |
| 2012/0229754 | A1 | 9/2012 | Iyer et al. |
| 2012/0250151 | A1 | 10/2012 | Lee et al. |
| 2012/0287512 | A1 | 11/2012 | Egan et al. |
| 2013/0171546 | A1 | 7/2013 | White et al. |
| 2013/0176628 | A1 | 7/2013 | Batchko et al. |
| 2013/0300635 | A1 | 11/2013 | White et al. |
| 2014/0009039 | A1 | 1/2014 | Jenninger et al. |
| 2014/0078586 | A1 | 3/2014 | Spurgeon et al. |
| 2014/0153102 | A1 | 6/2014 | Chang |
| 2014/0186215 | A1 | 7/2014 | Shinta et al. |
| 2014/0227548 | A1 | 8/2014 | Myrick |
| 2014/0300857 | A1 | 10/2014 | Cohen-Tannoudji et al. |
| 2014/0312737 | A1 | 10/2014 | Jenninger et al. |
| 2015/0062719 | A1 | 3/2015 | Kyung et al. |
| 2015/0116656 | A1 | 4/2015 | Stevens et al. |
| 2015/0138110 | A1 | 5/2015 | Yairi et al. |
| 2015/0146161 | A1 | 5/2015 | Rigato et al. |
| 2015/0302990 | A1 | 10/2015 | Ghosh et al. |
| 2015/0323812 | A1 | 11/2015 | Ishak et al. |
| 2016/0004099 | A1 | 1/2016 | Steven et al. |
| 2016/0091635 | A1 | 3/2016 | Ibuki et al. |
| 2016/0187985 | A1 | 6/2016 | Lim et al. |
| 2017/0021385 | A1 | 1/2017 | Smith et al. |
| 2017/0045649 | A1 | 2/2017 | Bolis |
| 2017/0160600 | A1 | 6/2017 | Galstian et al. |
| 2017/0177106 | A1 | 6/2017 | Kihara |
| 2017/0184848 | A1 | 6/2017 | Vallius |
| 2017/0188021 | A1 | 6/2017 | Lo et al. |
| 2017/0192595 | A1 | 7/2017 | Choi et al. |
| 2017/0261653 | A1 | 9/2017 | Peyman |
| 2017/0299956 | A1 | 10/2017 | Holland et al. |
| 2017/0317269 | A1 | 11/2017 | Zhang et al. |
| 2017/0336641 | A1 | 11/2017 | Von Und Zu Liechtenstein |
| 2018/0255250 | A1 | 9/2018 | Price et al. |
| 2018/0275394 | A1 | 9/2018 | Yeoh et al. |
| 2018/0335649 | A1 | 11/2018 | Tsai |
| 2019/0173128 | A1 | 6/2019 | Msco et al. |
| 2019/0243123 | A1 | 8/2019 | Bohn |
| 2019/0296218 | A1 | 9/2019 | Ouderkirk et al. |
| 2019/0302479 | A1 | 10/2019 | Smyth et al. |
| 2020/0166742 | A1 | 5/2020 | Peyman |
| 2020/0251709 | A1 | 8/2020 | Lee et al. |

FOREIGN PATENT DOCUMENTS

| | | |
|---|---|---|
| WO | 2008/156166 A1 | 12/2008 |
| WO | 2010/078666 A1 | 7/2010 |
| WO | 2010/104904 A2 | 9/2010 |
| WO | 2019/183431 A1 | 9/2019 |
| WO | 2019/190887 A1 | 10/2019 |

OTHER PUBLICATIONS

Notice of Allowance received for U.S. Appl. No. 16/013,837 dated Apr. 14, 2020, 14 pages.

Preinterview First Office Action received for U.S. Appl. No. 15/992,731 dated Sep. 27, 2019, 17 pages.

(56) References Cited

OTHER PUBLICATIONS

Final Office Action received for U.S. Appl. No. 15/992,731 dated Jun. 2, 2020, 25 pages.
Non-Final Office Action received for U.S. Appl. No. 15/992,731 dated Aug. 24, 2020, 27 pages.
Examiner-Initiated Interview Summary received for U.S. Appl. No. 16/008,635 dated Apr. 20, 2020, 3 pages.
Notice of Allowance received for U.S. Appl. No. 16/008,635 dated May 4, 2020, 32 pages.
Non-Final Office Action received for U.S. Appl. No. 16/059,091 dated Apr. 8, 2020, 54 pages.
Final Office Action received for U.S. Appl. No. 16/059,091 dated Sep. 21, 2020, 18 pages.
Non-Final Office Action received for U.S. Appl. No. 16/106,945 dated Apr. 16, 2020, 59 pages.
Non-Final Office Action received for U.S. Appl. No. 16/041,634 dated Jul. 30, 2020, 24 pages.
Notice of Allowance received for U.S. Appl. No. 16/041,634 dated Aug. 28, 2020, 31 pages.
Preinterview First Office Action received for U.S. Appl. No. 16/018,752 dated Dec. 16, 2019, 19 pages.
Preinterview First Office Action received for U.S. Appl. No. 16/018,746 dated Jul. 14, 2020, 20 pages.
Notice of Allowance Action received for U.S. Appl. No. 16/018,746 dated Sep. 17, 2020, 24 pages.
Preinterview First Office Action received for U.S. Appl. No. 16/021,580 dated Aug. 4, 2020, 48 pages.
Press Kit Home, "Adaptive glasses", accessed at http://tvc.utah.edu, as accessed on Mar. 13, 2018, 5 pages.
Billah et al., "Microstructure Evolution and Electrical Characterization of Lanthanum doped Barium Titanate (BaTi03) Ceramics", International Conference on Mechanical Engineering, AIP Cont. Proc. 1754, accessed on Jul. 12, 2016, pp. 030006-1-030006-7.
Cao et al., Grain Size and Domain Size Relations in Bulk Ceramic Ferroelectric Materials, J. Phys. Chem Solids vol. 57, No. 10, pp. 1499-1505, 1996.
Ding et al., "Surface profiling of an aspherical liquid lens with a varied thickness membrane," Optics Express 3122-3132, vol. 25, No. 4 (Feb. 6, 2017).
He et al., Linear Electro-Optic Properties of Orthorhombic PZN-8%PT Single Crystal, IEEE Transactions on Ultrasonics, Ferroelectrics, and Frequency Control, vol. 58, No. 6 (Jun. 1, 2011).
Knapp et al., "Understanding Zirconia Crown Esthetics and Optical Properties" Inclusive magazine accessed at http://glidewelldental.com/education/inclusive-dental-implant-magazine-volume-2-issue-4/, as accessed on Jun. 12, 2018, vol. 2, Issue 4, 17 pages.
Optotune, "Focus tunable lenses", accessed at http://www.optotune.com/technology/focus-tunable-lenses, accessed on Mar. 13, 2018, 2 pages.
Polight, "How does it work", accessed at http://www.polight.com/technology-and-products/how-does-it-work/default.aspx, accessed on Mar. 13, 2018, 3 pages.
UZOOM Adlens, "Adjustable Lens Glasses: How They Work", accessed at https://adlens.com/how-it-works/, accessed on Mar. 28, 2018, 9 pages.
Piezo Technology, "Highly Reliable Multilayer Piezo Actuators", accessed on https://www.piceramic.com/en/piezo-technology/picma/, accessed on Mar. 14, 2018, 8 pages.
Piezo Technology, "Displacement Modes of Piezoelectric Actuators", accessed on https://www.piceramic.com/en/piezo-technology/properties-piezo-actuators/displacement-modes/, accessed on Mar. 14, 2018, 12 pages.
Jiang et al., "Transparent Electro-Optic Ceramics and Devices", Proceedings vol. 5644, Optoelectronic devices and integration, accessed at https://doi.org/10.1117/12.582105, Jan. 17, 2005, 15 Pages.
Keplinger et al., "Stretchable, Transparent, Ionic Conductors", Science Magazine, vol. 341, DOI:10.1126/science.1240228, Accessed on Aug. 30, 2013, pp. 984-987.
Kong et al., "Transparent Ceramic Materials", Transparent Ceramics, Topics in Mining, Metallurgy, and Materials Engineering, Ch. 2, DOI: 10.1007/978-3-319-18956-7_2, Springer international Publishing Switzerland 2015, pp. 29-91.
Patra et al., "Comparison on Optical Properties of Pure and Doped Lithium Tetraborate Single Crystals and Glasses", Solid State Physics: Proceedings of the 56th DAE Solid State Physics Symposium 2011, AIP Conf. Proc. 1447, Dec. 11, 2012, pp. 1335-1336.
Riegler et al., "Index Matching Silicone for High Brightness LED Packaging", IMAPS International Conference on Device Packaging March 13-16, Scottsdale AZ., Accessed on Mar. 18, 2005, 17 Pages.
Shian et al., Tunable Lenses using Transparent Dielectric Elastomer Actuators, Optics Express, vol. 21, No. 7 (Apr. 2, 2013).
Hocking, L.M., "The effect of slip on the motion of a sphere close to a wall and of two adjacent spheres", Journal of Engineering Math., vol. 7 (1973), pp. 207-221.
Wang et al., "A Highly Stretchable, Transparent, and Conductive Polymer", Science Advances vol. 3, No. 3, e1602076, Mar. 10, 2017, pp. 1-10.
APC International, Lid., "Piezoelectric Materials, New Materials, Piezo theory", accessed at www.americanpiezo.com/knowledge-center/piezo-theory/new-materials/html, accessed on Mar. 15, 2018, 1 page.
Zhao et al., "Spherical aberration free liquid-filled tunable lens with variable thickness membrane," Optics Express vol. 23, No. 16, accessed at https://doi.org/10.1364/0.23.021264, accessed on Aug. 5, 2015, pp. 21264-21278.
Andrew J. Ouderkirk, et al.; Apparatuses, Systems, and Methods for Adjusting Fluid Lenses; U.S. Appl. No. 16/008,635, filed Jun. 14, 2018.
Katherine Marie Smyth, et al.; Optical Lens Assemblies, Head-Mounted Displays, and Related Methods; U.S. Appl. No. 16/021,650, filed Jun. 28, 2018.
Andrew John Ouderkirk, et al.; Multi-Element Prescription Lenses With Eye-Tracking; U.S. Appl. No. 16/041,634, filed Jul. 20, 2018.
Andrew John Ouderkirk, et al.; Electroactive Polymer Devices and Nanovoided Polymer Materials and Methods and Systems for Fabrication Thereof; U.S. Appl. No. 16/106,945, filed Aug. 21, 2018.
Andrew John Ouderkirk, et al.; Nanovoided Electroactive Polymer Devices, Systems, and Methods; U.S. Appl. No. 16/041,858, filed Jul. 23, 2018.
Andrew John Ouderkirk, et al.; Electroactive Polymer Devices, Systems, And Methods; U.S. Appl. No. 16/059,091, filed Aug. 9, 2018.
Andrew John Ouderkirk, et al.; Optical Devices, Systems, and Methods of Manufacturing; U.S. Appl. No. 52/646,900, filed Mar. 22, 2018.
Andrew John Ouderkirk, et al.; Optical Devices, Systems, and Methods of Manufacturing; U.S. Appl. No. 52/650,254, filed Mar. 29, 2018.
Katherine Marie Smyth, et al.; Optical Lens Assemblies and Related Methods; U.S. Appl. No. 16/018,746, filed Jun. 26, 2018.
Katherine Marie Smyth, et al.; Systems and Methods for Actuation of Asymmetric Optical Elements; U.S. Appl. No. 15/992,731, filed May 30, 2018.
Andrew John Ouderkirk, et al.; Optical Lens Assemblies and Related Methods; U.S. Appl. No. 16/018,752, filed Jun. 26, 2018.
John M. Cooke, et al.; Optical Lens Assemblies, Head-Mounted Displays, and Methods of Altering Optical Properties of Optical Lens Assemblies; U.S. Appl. No. 16/013,837, filed Jun. 20, 2018.
Katherine Marie Smyth, et al.; Optical Lens Assemblies, Head-Mounted Displays, and Related Methods; U.S. Appl. No. 16/016,428, filed Jun. 22, 2018.
Non-Final Office Action received for U.S. Appl. No. 16/106,945 dated Mar. 30, 2021, 111 pages.
Notice of Allowance received for U.S. Appl. No. 16/018,752 dated Mar. 10, 2021, 32 pages.
Communication pursuant to Article 94(3) EPC received for EP Patent Application Serial No. 19715707.6 dated Mar. 22, 2021, 5 page.
Non-Final Office Action received for U.S. Appl. No. 16/016,428 dated Mar. 12, 2021, 56 pages.

(56) References Cited

OTHER PUBLICATIONS

John M. Cooke, et al.; Optical Lens Assemblies, Head-Mounted Displays, and Related Methods; U.S. Appl. No. 16/021,580, filed Jun. 28, 2018.

Andrew John Ouderkirk, et al.; Electroactive Polymer Devices, Systems, and Methods; U.S. Appl. No. 16/035,562, filed Jul. 13, 2018.

"Adjustable Reading Glasses," URL: https://adlens.com/, retrieved on May 7, 2018, 1 page.

Guha et al., "Creating nanoscale emulsions using condensation", Nature Communications, vol. 8, No. 1371, Nov. 2017, pp. 1-7.

Merriam-Webster, "Porosity", URL: https://www.merriam-webster.com/dictionary/porosity, retrieved on Apr. 8, 2020, pp. 1-8.

International Search Report and Written Opinion received for PCT Application Serial No. PCT/US2019/023484 dated Jul. 3, 2019, 9 pages.

International Preliminary Report on Patentability received for PCT Application Serial No. PCT/US2019/023484 dated Oct. 1, 2020, 8 pages.

International Search Report and Written Opinion received for PCT Application Serial No. PCT/US2019/023485 dated Jul. 4, 2019, 11 pages.

International Preliminary Report on Patentability received for PCT Application Serial No. PCT/US2019/023485 dated Oct. 8, 2020, 8 pages.

Notice of Allowance received for U.S. Appl. No. 15/972,794 dated Oct. 16, 2020, 22 pages.

Notice of Allowance received for U.S. Appl. No. 15/992,731 dated Nov. 18, 2020, 37 pages.

Final Office Action received for U.S. Appl. No. 16/106,945 dated Nov. 24, 2020, 94 pages.

Final Office Action received for U.S. Appl. No. 16/018,752 dated Nov. 30, 2020, 41 pages.

Notice of Allowance received for U.S. Appl. No. 16/018,746 dated Nov. 3, 2020, 39 pages.

Notice of Allowance received for U.S. Appl. No. 16/021,580 dated Dec. 9, 2020, 68 pages.

Preinterview First Office Action received for U.S. Appl. No. 16/021,650 dated Feb. 1, 2021, 47 pages.

Gurvich, Mark R., "On Characterization of Anisotropic Elastomeric Materials for Structural Analysis", Rubber Chemistry and Technology, vol. 77, No. 1, 2004, pp. 115-130.

Non-Final Office Action received for U.S. Appl. No. 16/035,562 dated Jun. 10, 2021, 36 pages.

Non-Final Office Action received for U.S. Appl. No. 16/016,428 dated Jun. 16, 2021, 43 pages.

\* cited by examiner

2200
Discplacing a portion of a compliant peripheral component positioned between peripheral portions of a deformable element and of a structural support element
2210
Deforming the deformable element to change at least one optical property of an optical lens assembly
2220
FIG. 22

OPTICAL LENS ASSEMBLIES, HEAD-MOUNTED DISPLAYS, AND RELATED METHODS

CROSS REFERENCE TO RELATED APPLICATION

This application is a continuation of U.S. Non-Provisional patent application Ser. No. 16/021,580, filed Jun. 28, 2018, titled "OPTICAL LENS ASSEMBLIES, HEAD-MOUNTED DISPLAYS, AND RELATED METHODS," which claims the benefit of U.S. Provisional Application No. 62/650,254, filed Mar. 29, 2018, the entire disclosure of each of which is incorporated herein by this reference.

BACKGROUND

Adjustable-lens systems may be useful in a variety of devices, including eyeglasses, cameras, instrumentation, and virtual or augmented reality ("VR/AR") systems, such as to adjust the focus of a display element (e.g., screen) or of a real-world image viewed by a user. One example of an adjustable-lens system is a "liquid lens" assembly. As accommodative elements, liquid lenses may be varifocal, may have high transmissivity, and with proper optical design can achieve low off-axis aberration and distortion for high image quality over a range of optical powers.

Liquid lenses often include a flexible membrane that is directly coupled to a rigid backplane and a fluid that is disposed between the rigid backplane and the membrane. Inducing a change in fluid pressure may result in a convex or concave lens shape, which may result in a change in optical power. Conventional actuation techniques for liquid lenses typically include applying a force to a force distributor ring positioned on a peripheral portion of a major surface of the flexible membrane, which may cause the change in fluid pressure and resulting shape change. Such techniques, however, typically require the lens' frame to be thick enough to accommodate the actuation mechanism used to apply the force. In addition, deformation profiles achievable by conventional actuation techniques may be limited.

SUMMARY

As will be described in greater detail below, the present disclosure describes optical lens assemblies and head-mounted displays ("HMDs") including a compliant peripheral component positioned between a deformable element and a structural support element, and an actuator configured to displace at least a portion of the compliant peripheral component to deform the deformable element.

In some embodiments, the present disclosure includes optical lens assemblies that may include a deformable element, a structural support element, a substantially transparent deformable medium positioned between the deformable element and the structural support element, a compliant peripheral component positioned between peripheral portions of the deformable element and the structural support element, and an actuator. The actuator may be configured to displace at least a portion of the compliant peripheral component to deform the deformable element and change at least one optical property of the optical lens assembly.

In some examples, the actuator may be configured to displace at least a portion of the compliant peripheral component in a direction along an optical axis of the optical lens assembly, or in a direction that is substantially orthogonal to the optical axis of the optical lens assembly. The actuator may, in some embodiments, include at least a portion of the compliant peripheral component. In one example, the actuator may include an electroactive material that is coupled to, or that forms at least a portion of, the compliant peripheral component. Such an actuator may also include a driver circuit that is configured to apply a voltage to the electroactive material.

In some examples, the actuator may include an electric motor configured to tension a cable. At least a portion of the cable may be within at least one sheath, or the cable may be unsheathed. The actuator may include a shape-memory alloy material. The actuator may include a pump or a piston that is configured to cause an expandable member to expand. The compliant peripheral component may include the expandable member, or the expandable member may be positioned adjacent to at least a portion of the compliant peripheral component.

In some examples, the deformable element may be under an initial mechanical stress prior to actuation by the actuator. A pre-tensioning ring may be coupled to a perimeter of the deformable element to hold the initial mechanical stress. The compliant peripheral component and the actuator may be positioned outside of a substantially transparent aperture of the optical lens assembly. The actuator may be configured to cause the deformable element to deform, via displacement of at least a portion of the compliant peripheral component, into at least one of a substantially convex shape or a substantially concave shape. The compliant peripheral component may be or include a bi-stable element. At least a portion of at least one of the compliant peripheral component or the actuator may serve as an edge seal for at least a portion of a cavity defined by the deformable element and the structural support element. The substantially transparent deformable medium may include at least one of a liquid, a gas, a gel, a foam, or a polymer.

In some embodiments, the present disclosure includes head-mounted displays, which may include a support housing, an optical lens assembly coupled to the support housing, and a display element coupled to the support housing. The optical lens assembly may include a deformable element, a structural support element, a substantially transparent deformable medium positioned between the deformable element and the structural support element, a compliant peripheral component positioned between peripheral portions of the deformable element and the structural support element, and an actuator configured to displace at least a portion of the compliant peripheral component to deform the deformable element and change at least one optical property of the optical lens assembly.

In some examples, the actuator may be configured to displace at least a portion of the compliant peripheral component in a direction along an optical axis of the optical lens assembly, or in a direction that is substantially orthogonal to the optical axis of the optical lens assembly.

In some embodiments, methods of altering at least one optical property of an optical lens assembly are disclosed. In accordance with such methods, at least a portion of a compliant peripheral component that is positioned between peripheral portions of a deformable element and of a structural support element may be displaced with an actuator. As a result of the displacement of the compliant peripheral component, the deformable element may be deformed to change at least one optical property of the optical lens assembly.

In some examples, as a result of the displacement of the compliant peripheral component, at least a portion of a substantially transparent deformable medium that is positioned within a cavity defined by the deformable element and the structural support element may be displaced. A pressure within the cavity may be altered to deform the deformable element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 22 is a flow diagram illustrating a method of altering optical properties of an optical lens assembly, according to an embodiment of the present disclosure.

Figure 1:
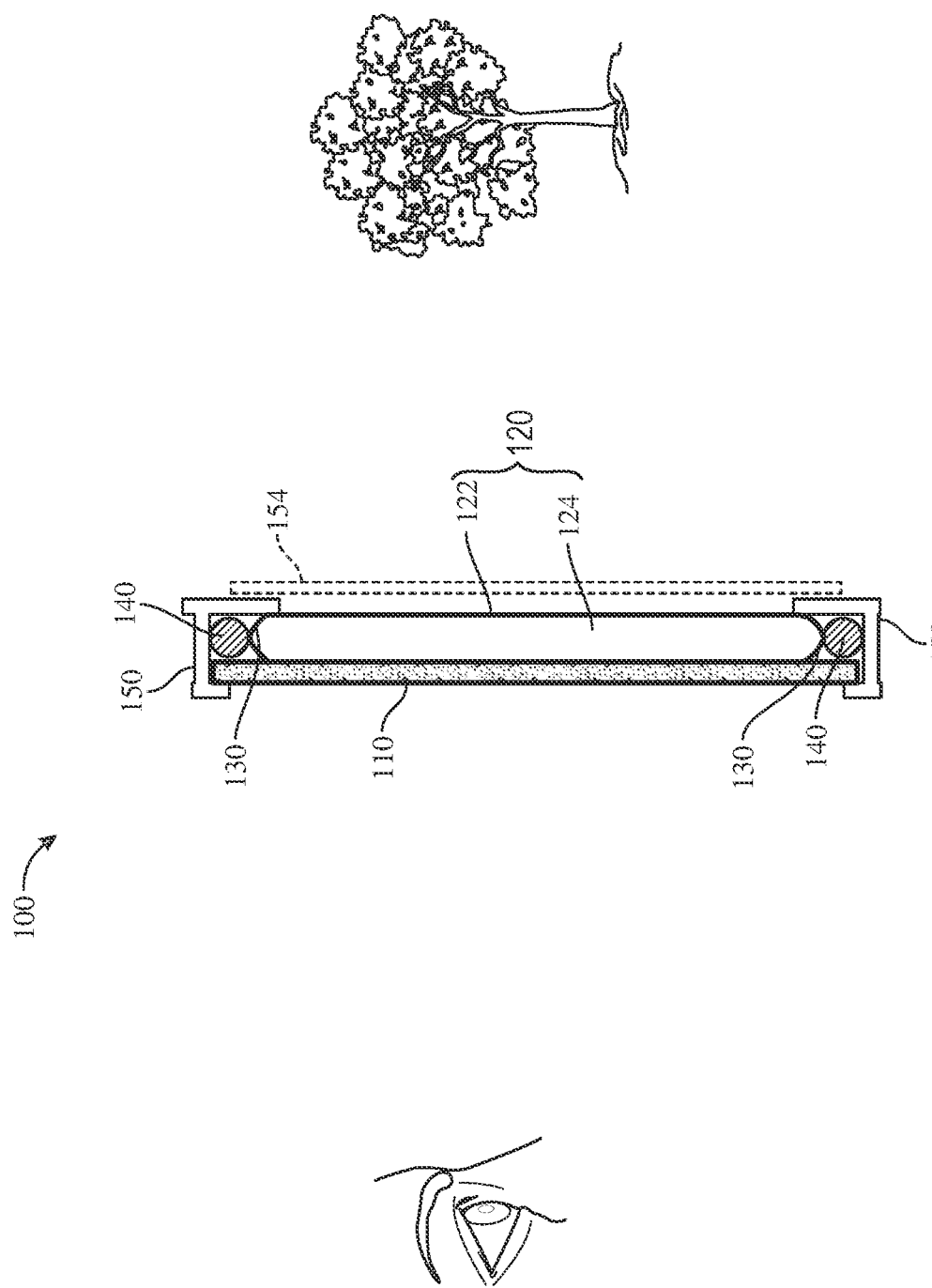
FIG. 1 is a cross-sectional side view of an optical lens assembly in a neutral, non-actuated state, according to an embodiment of the present application.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, combinations, and alternatives falling within the scope of the appended claims.

DETAILED DESCRIPTION OF EXAMPLE EMBODIMENTS

The present disclosure is generally directed to optical lens assemblies, HMDs, and related methods. As will be explained in greater detail below, embodiments of the present disclosure may include optical lens assemblies that are configured for actuation, and therefore changing of at least one optical property, by displacement of a compliant peripheral component positioned between peripheral portions of a deformable element and a structural support element. The displacement of the compliant peripheral component, as opposed to conventional configurations in which a force is applied to a major surface of the deformable element, may, in some embodiments, improve actuation of optical lens assemblies, such as by reducing an actuator size, reducing a thickness of a housing (e.g., frame element), reducing an actuation force, and/or altering deformation profiles of the deformable elements.

Figure 2:
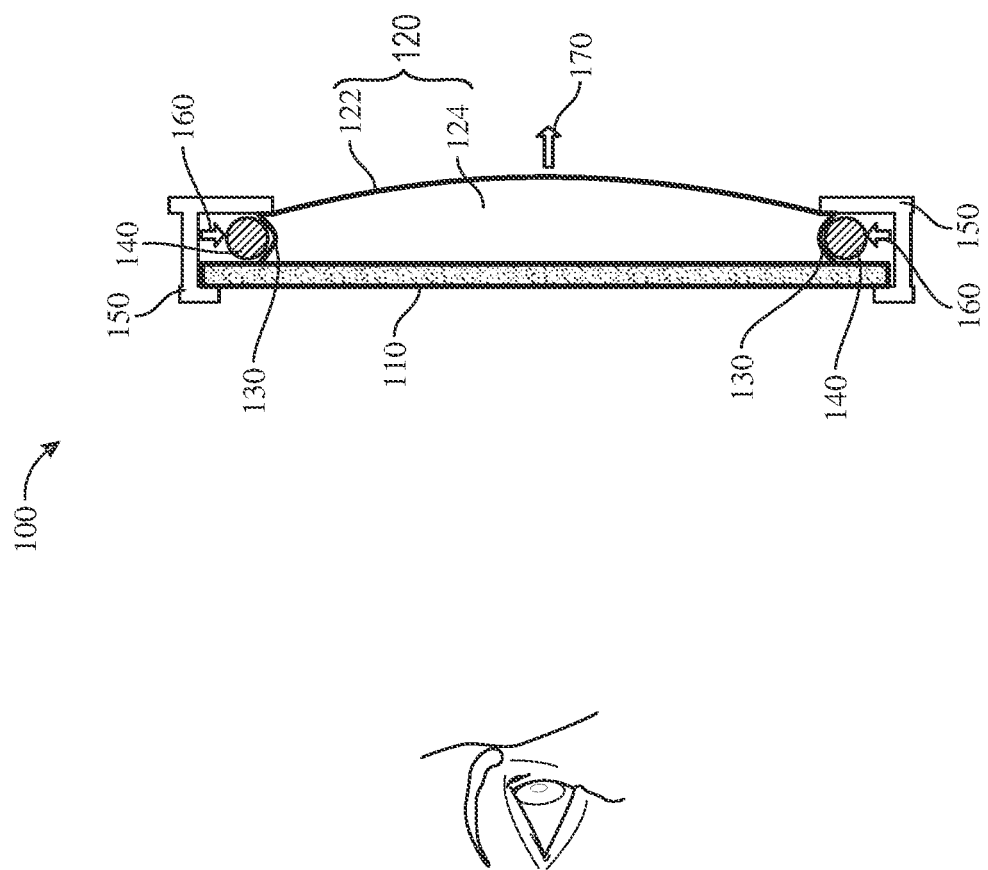
FIG. 2 is a cross-sectional side view of the optical lens assembly of FIG. 1 in an actuated state.

The following will provide, with reference to FIGS. 1 and 2, detailed descriptions of example optical lens assemblies that include a compliant peripheral component and an actuator configured to displace at least a portion of the compliant peripheral component to deform a deformable element. The description of FIG. 3 relates to an embodiment of an HMD that includes optical lens assemblies according to the present disclosure. With reference to FIGS. 4-21, the following will provide detailed descriptions of additional embodiments of optical lens assemblies according to the present disclosure. The discussion relating to FIG. 22 will provide a detailed description of a method of altering at least one optical property of an optical lens assembly, according to the present disclosure.

FIG. 1 shows a cross-sectional side view of an optical lens assembly 100 in a neutral, non-actuated state. The optical lens assembly 100 may include a rigid or semi-rigid structural support element 110 and a deformable optical element 120 (including a deformable element 122 and a deformable medium 124) positioned over the structural support element 110. In some examples, relational terms such as "over," "on," "downward," etc., may be used for clarity and convenience in understanding the disclosure and accompanying drawings, and may not necessarily connote or depend on any specific preference, orientation, or order, except where the context clearly indicates otherwise. The deformable element 122 may be directly (e.g., bonded, adhered) or indirectly (e.g., via a separate component or material) coupled to the structural support element 110.

As shown in FIG. 1, in embodiments in which the deformable element 122 is directly coupled to the structural support element 110, an outer periphery of the deformable element 122 may define a compliant peripheral component 130 for containing the deformable medium 124 in a cavity defined between the deformable element 122 and the proximal structural support element 110. In other embodiments, the compliant peripheral component 130 may be a separate, distinct element positioned between and coupled to the deformable element 122 and the structural support element 110. An actuator component 140 may be positioned adjacent to (e.g., radially outside of) the compliant peripheral component 130, and may be configured to displace at least a portion of the compliant peripheral component 130 upon actuation of the optical lens assembly 100. The compliant peripheral component 130 may define an edge seal for containing the deformable medium 124.

A housing 150 (e.g., an eyeglass frame element, an AR or VR headset frame element, etc.) may support the other components of the optical lens assembly 100. In some embodiments, the housing 150 may also support a display element 154 (e.g., an electronic display element, etc.) for displaying an image to the user, and/or another optical lens assembly similar to the optical lens assembly 100 illustrated in FIG. 1. In such embodiments, the display element 154 may be positioned adjacent to the deformable element 122 and between the optical lens assembly 100 and the other optical lens assembly. Additionally, FIG. 1 illustrates the structural support element 110 on a side of the optical lens assembly 100 proximate the user's eye and the deformable element 122 on an opposite side of the optical lens assembly 100. In additional embodiments, the structural support element 110 may be on a side of the optical lens assembly 100 distant from the user's eye and the deformable element 122 may be positioned proximate to the user's eye.

The structural support element 110, the deformable element 122, and the deformable medium 124 may each be substantially transparent to allow light to pass to an eye of a user. Accordingly, at least portions of the structural support element 110 and of the deformable optical element 122 may be positioned in a substantially transparent aperture of the optical lens assembly 100, which may refer to a portion of the optical lens assembly 100 that allows the passage of light to a user's eye.

In some examples, the phrase "substantially transparent" may refer to an element exhibiting greater than about 20% transmissivity and less than about 10% haze in the visible light spectrum. In some examples, the term "substantially," in reference to a given parameter, property, or condition, may generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 90% met, at least 95% met, at least 99% met, etc. In some examples, the phrase "deformable optical element" may refer to an element (including one or more materials or sub-elements) that is configured to be deformed to alter an optical property (e.g., an accommodative property or an adaptive optical property) of the optical lens assembly. In some examples, the term "accommodative" or "accommodation" may refer to changes in an optical power. In some examples, the term "adaptive" may refer to tunability for providing control, compensation, and/or correction of wave front errors such as distortion and aberration(s). In some examples, "aberration" may generally refer to an optical image defect, including any deviation from diffraction-limited optical performance. Aberrations can be chromatic or monochromatic and may include, for example, tilt, defocus, astigmatism, coma, distortion, field curvature, spherical errors, cylindrical errors, etc.

In FIG. 1, the deformable optical element 120 is shown in a neutral, non-actuated state (e.g., with no applied actuation force). In the non-actuated state, a surface of the deformable element 122 may have a substantially planar shape, and the optical lens assembly 100 may be configured and positioned to not substantially alter an image or view passing through the optical lens assembly 100. In other words, the non-actuated state may be a substantially zero-optical power state.

The structural support element 110 may be or include a substantially transparent material with a higher relative rigidity than the deformable element 122 and the deformable medium 124. By way of example, the structural support element 110 may be or include one or more of a glass material, a sapphire material, a crystal material (e.g., quartz), a polycarbonate material, another substantially transparent polymer material, or a substantially transparent non-polymeric material. The structural support element 110 may provide a protective barrier for the user's eye, for the deformable optical element 122, and for other components of the optical lens assembly 100 (e.g., a display element, an actuator, etc.).

The structural support element 110 may also include an eye-tracking element, which may be configured for estimating an inter-pupillary distance of the user's eyes, a gaze distance, and/or a focal point. The eye-tracking element, if present, may include a selective-transmission element that transmits light having a selected property and that does not transmit light that does not have the selected property. For example, the structural support element 110 may include a coating or material that allows visible light to pass while reflecting non-visible light (e.g., infrared light). In this example, an infrared light source may direct infrared light to the structural support element 110, which may be reflected onto the user's eye. An infrared camera may then detect infrared light that is reflected from the user's eye and back to the structural support element 110 to track the user's eye(s).

As shown in FIG. 1, the structural support element 110 may be a substantially planar element that does not substantially alter an image viewed through the structural support element 110. In other embodiments, the structural support element 110 may include a corrective ophthalmic lens (e.g., a positive-optical power lens, a negative-optical power lens, a lens for correction of an aberration, etc.), or another optical lens element. The shape of the structural support element 110 may, in some embodiments, be tailored to or selected in consideration of a specific user to correct vision impairments or to otherwise meet user preferences. Optionally, an anti-reflective coating may be applied to the structural support element 110. In some examples, the structural support element 110 can be a zero-optical power meniscus lens element for improved anti-reflective properties and integration with potentially non-flat optical eye-tracking and/or ophthalmic optical elements at the structural support element 110. A zero-optical power curved lens may provide some advantages over a substantially planar lens for some applications, such as for improved anti-reflective properties and/or improved fit to a user's facial contours, for example.

The deformable element 122 may include a substantially transparent, flexible film. By way of example and not limitation, the deformable element 122 may include at least one of a polymer material (e.g., a thermoset polymer, a thermoplastic polymer, an elastomer, a silicone material, polydimethylsiloxane, a polyurethane elastomer, a fluoropolymer material, polyvinylidene fluoride or a copolymer thereof, a polyolefin material, a polyacrylate material, etc.), a ceramic material, a glass material, a crystalline (e.g., substantially single-crystal) material, or a composite material. The deformable element 122 may be or include a single material or a multi-layer structure. The deformable element 122 may include a barrier material for controlling gas or liquid diffusion, an anti-reflective material, or a combination thereof. In some examples, a material of the deformable element 122 may include a flexible, transparent, water-impermeable material, such as clear and elastic polyolefins, polycycloaliphatics, polyethers, polyesters, polyimides and/or polyurethanes, for example, a polyvinylidene chloride film, including a commercially available film.

In some examples, and depending on the material and configuration selected for the deformable element 122, the deformable element 122 may be pre-tensioned to induce an initial mechanical stress in the deformable element, such as to achieve a desired profile and response to actuation and/or to reduce the negative effects of so-called "gravity sag." Gravity sag may refer to a lower portion of the deformable optical element 122 being thicker on average than an upper portion due to gravity urging the deformable element 122 and/or deformable medium 124 downward when the optical lens assembly 100 is in use. In some embodiments, a portion of the housing 150 may be coupled to a perimeter of the deformable element 122 and may act as a pre-tensioning ring to maintain the applied pre-tension and initial mechanical stress in the deformable element 122. In additional embodiments, a separate pre-tensioning ring may be coupled to a perimeter of the deformable element 122 to maintain the applied pre-tension and initial mechanical stress.

The deformable medium 124 may be a substantially transparent material with mechanical properties that allow for deformation upon actuation of the optical lens assembly 100. By way of example and not limitation, the deformable medium 124 may be or include a gas (e.g., air, nitrogen, etc.), a liquid (e.g., water, degassed water, mineral oil, saline solution, a high-refractive index liquid, etc.), a polymer material, a gel (e.g., a silicone gel), or a foam (e.g., a silica aerogel), etc.

The compliant peripheral component 130 may be or include, for example, a polymer, a metal, or a composite material. The compliant peripheral component 130 may be positioned outside of the substantially transparent aperture of the optical lens assembly 100, and may be at least substantially covered by the housing 150. In some embodiments, the compliant peripheral component 130 may be configured to act in a non-linear, bi-stable manner, such that the compliant peripheral component 130 may not be stable in a flat (in cross-section) position. For example, the compliant peripheral component 130 may have a shape that curves outward in a non-actuated state, and a shape that curves inward in an actuated state. Thus, upon actuation, the compliant peripheral component 130 may snap over-center from bulging outward (as shown in FIG. 1) to bulging inward (as shown in FIG. 2). A bi-stable compliant peripheral component 130 may, in some embodiments and for some applications, advantageously be capable of load-matching to some types of actuators.

The actuator component 140 may, in some embodiments, be an elongated cable or wire positioned around at least a portion of a perimeter of the compliant peripheral component 130. For example, the actuator component 140 may be or include a metal, polymer, or composite cable or wire. The actuator component 140 may be positioned outside of the substantially transparent aperture of the optical lens assembly 100, and may be at least substantially covered by the housing 150. Applying tension to the actuator component 140 by an actuator may cause the actuator component 140 to be displaced inward, toward and/or against the compliant peripheral component 130.

FIG. 2 shows the optical lens assembly 100 in an actuated state, with the actuator component 140 applying an actuation force 160 against the compliant peripheral component 130 in a radially inward direction (i.e., in a direction that is substantially orthogonal to an optical axis of the optical lens assembly 100). The actuator component 140 may be manipulated (e.g., tensioned) by an electromechanical actuator, for example. Example mechanisms for causing the actuator component 140 to apply the actuation force 160 are described below, such as with reference to FIGS. 4, 5, 8, 9, 14, and 15.

Because of the actuation force 160, at least a portion of the compliant peripheral component 130 may be displaced inward to displace outer portions of the deformable medium 124, which may cause a central portion of the deformable optical element 120 to axially (i.e., in a direction along an optical axis of the optical lens assembly 100) bulge outward, as indicated in FIG. 2 by arrow 170. When actuated, the deformable optical element 120 may have a convex shape, such as to exhibit a positive-optical power. Thus, actuation may change at least one optical property (e.g., a focal distance) of the optical lens assembly 100. For example, actuation of the optical lens assembly 100 may adjust a user's view of an image rendered and displayed on the electronic display element 154 (FIG. 1) and/or of a real-world environment through the optical lens assembly 100. Upon removal of the actuation force 160 against the compliant peripheral component 130 by the actuator component 140, the compliant peripheral component 130 and the deformable optical element 120 may return to the non-actuated state shown in FIG. 1.

In some examples, the term "electromechanical actuator" may refer to a piezoelectric material or device, an electroactive polymer, an electrostrictive polymer, a shape memory alloy, a voice coil, a pneumatic actuator, an electromagnetic motor (including for example a servo motor, a stepper motor, a DC motor, or a similar motor), a hydraulic actuator, or a combination thereof. In some examples, the term "electroactive" may refer to a property of a material or composite material that deforms in response to an application of electrical energy (e.g., a voltage), and may generate electrical energy when strained or deformed. Example electroactive materials include piezoelectric materials, electrostrictor materials, dielectric elastomers, and ionic polymer conductors. Electroactive materials may function as transducers or as a component of transducers for actuating and deforming the deformable optical element 120.

Figure 3:
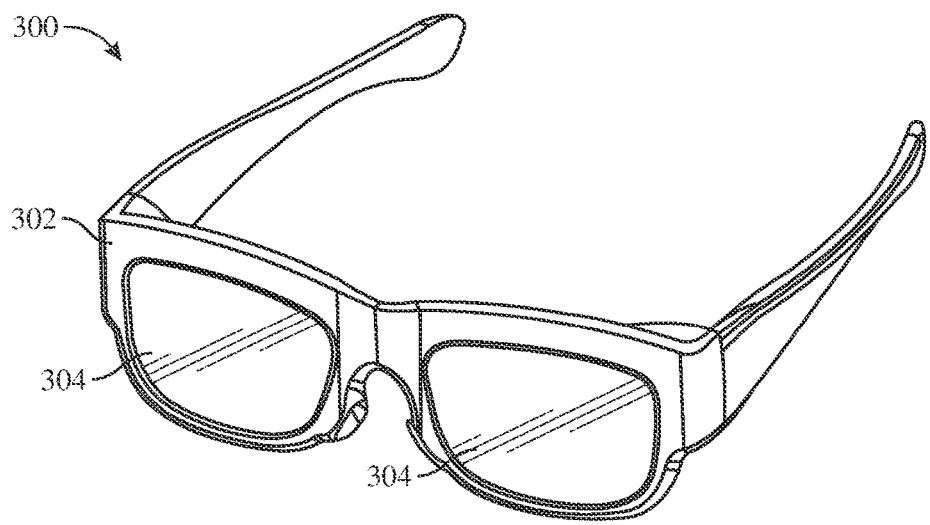
FIG. 3 is a perspective view of an HMD according to an embodiment of the present disclosure.

FIG. 3 illustrates an example HMD 300 (e.g., AR glasses, VR glasses) capable of incorporating embodiments of the optical lens assemblies described herein. In one example, the HMD 300 may be dimensioned to be worn on a head of a user. The HMD 300 may include a frame element 302 for supporting at least one deformable optical lens assembly 304 according to the present disclosure. In some embodiments, the optical lens assembly(ies) 304 may be tailored to or selected in consideration of a particular user's eye. In addition to supporting the optical lens assembly(ies) 304, the frame element 302 may also support other elements, such as an actuator, a driver circuit for the actuator, a power supply element (e.g., a battery), a communication component (e.g., a component for communication via Wi-Fi, BLUETOOTH, near-field communications, etc.), a display element, a graphics processing unit for rendering an image on the display element, an image sensor (e.g., a camera), an eye-tracking element, etc. As shown in FIG. 3, the optical lens assembly 304 may have an asymmetric shape. In addition, the HMD 300 may have a different shape (e.g., symmetric, circular, etc.) and design than is shown in FIG. 3, such as in the form of a VR headset or another shape that suits user preferences or a particular application. The optical lens assembly(ies) 304 may be or include, for example, any of the optical lens assemblies described in this disclosure.

Figures 4, 5:
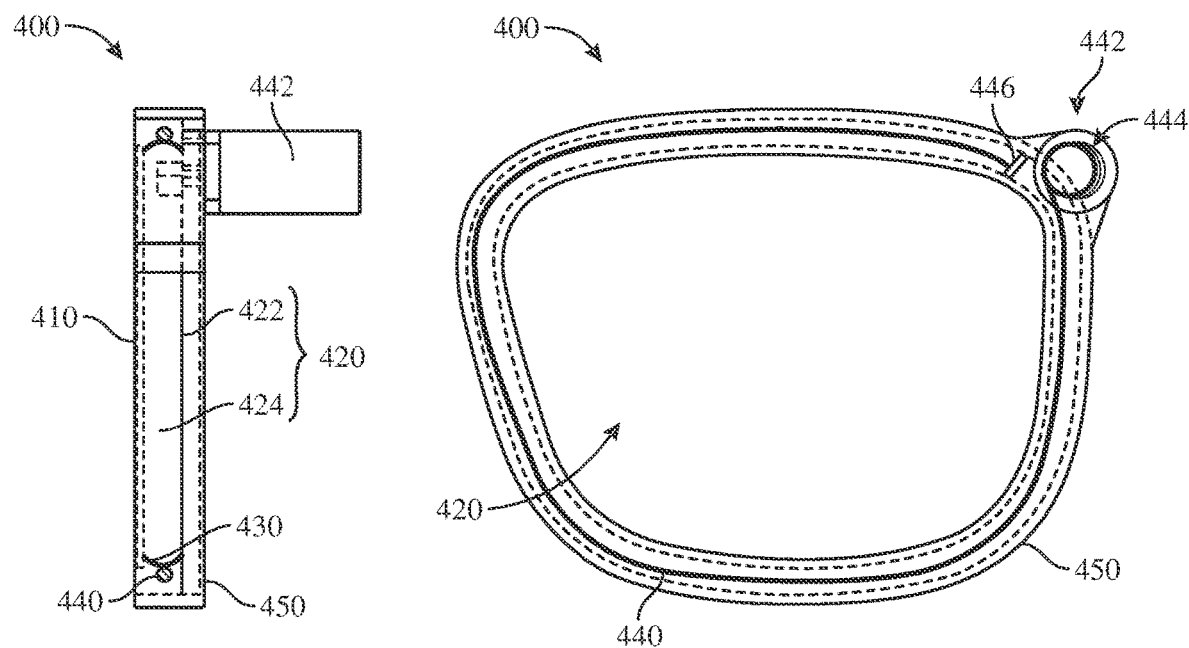
FIG. 4 is a side view of an optical lens assembly according to an embodiment of the present disclosure.
FIG. 5 is a front view of the optical lens assembly of FIG. 4.
Figure 6:
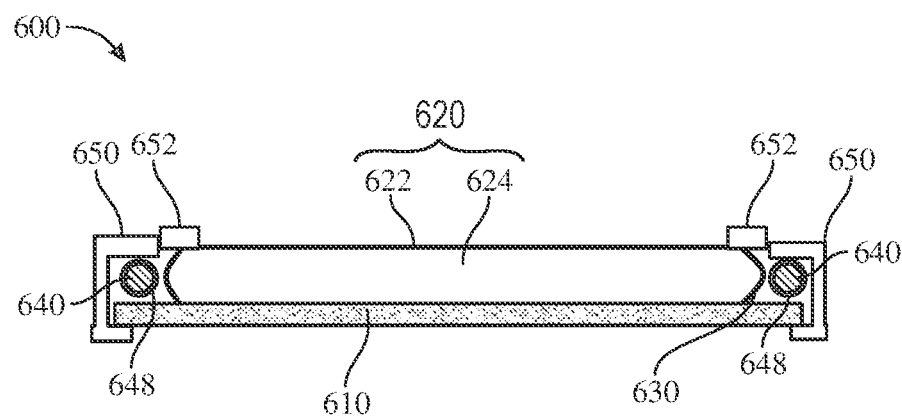
FIG. 6 is a cross-sectional side view of an optical lens assembly in a neutral, non-actuated state, according to an embodiment of the present disclosure.

FIGS. 4 and 5 respectively show a side view and a front view of an optical lens assembly 400 to illustrate an example actuation mechanism for displacing at least a portion of a compliant peripheral component 430 to change an optical property of the optical lens assembly 400. The optical lens assembly 400 may include a structural support element 410, a deformable optical element 420 (including a deformable element 422 and a deformable medium 424), and the compliant peripheral component 430 positioned between peripheral portions of the deformable element 422 and the structural support element 410. An elongated actuator component 440 may be positioned adjacent to (e.g., radially outside) and along a perimeter of the compliant peripheral component 430. Actuation of the actuator component 440 may be accomplished with an actuator 442 operably coupled to the actuator component 440. A housing 450 (e.g., an AR eyeglass frame, a VR headset frame, etc.) may support the other components of the optical lens assembly 400.

As illustrated in FIG. 5, for example, the actuator 442 may include a rotational electromagnetic motor and a spool 444 about which a proximal longitudinal end of the actuator component 440 may be at least partially wound during actuation, to apply a tension to the actuator component 440. An attachment structure 446 may couple a distal longitudinal end of the actuator component 440 to the housing 450. Upon rotation of the spool 444 in a first rotational direction (e.g., clockwise in the view of FIG. 5), a portion of the actuator component 440 may wrap at least partially around the spool 444, which may result in the actuator component 440 effectively shortening within the housing 450 and applying a radially inward actuation force on the compliant peripheral component 430. Upon rotation of the spool 444 in a second, opposite rotational direction (e.g., counter-clockwise in the view of FIG. 5), the actuator component 440 may be effectively lengthened within the housing 450, which may result in the actuator component 440 moving radially outward and relaxing the actuation force applied against the compliant peripheral component 430.

Although FIGS. 4 and 5 illustrate actuation by wrapping the actuator component 440 at least partially around the spool 444, the present disclosure is not limited to such actuation mechanisms. For example, the proximal end of the actuator component may instead be coupled to a linear actuator. In some examples, the actuator component 440 may be or include a shape-memory alloy material that may be shortened or lengthened upon application of sufficient electrical energy (e.g., a voltage).

FIGS. 6-9 illustrate another embodiment of an optical lens assembly 600 according to an embodiment of the present disclosure. The optical lens assembly 600 may include a substantially transparent, rigid or semi-rigid structural support element 610, a deformable optical element 620 (including a deformable element 622 and a deformable medium 624), and a compliant peripheral component 630 positioned between peripheral portions of the structural support element 610 and the deformable element 622. An elongated actuator component 640 may be positioned around at least a portion of a perimeter of the compliant peripheral component 630. A housing 650 may support the other components of the optical lens assembly 600. A pre-tensioning ring 652 may be coupled to a peripheral portion of the deformable element 622 to maintain an applied pre-tension and initial mechanical stress in the deformable element 622.

Figure 9:
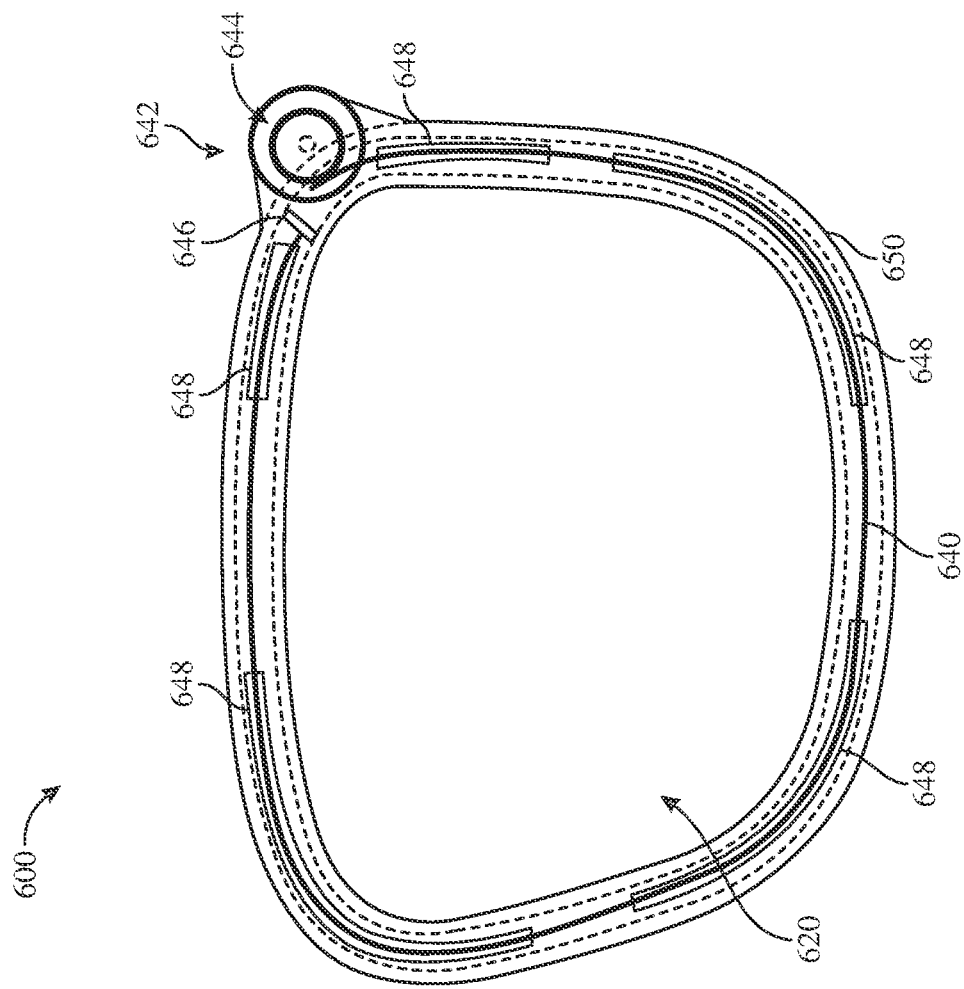
FIG. 9 is a front view of the optical lens assembly of FIG. 8.
Figure 8:
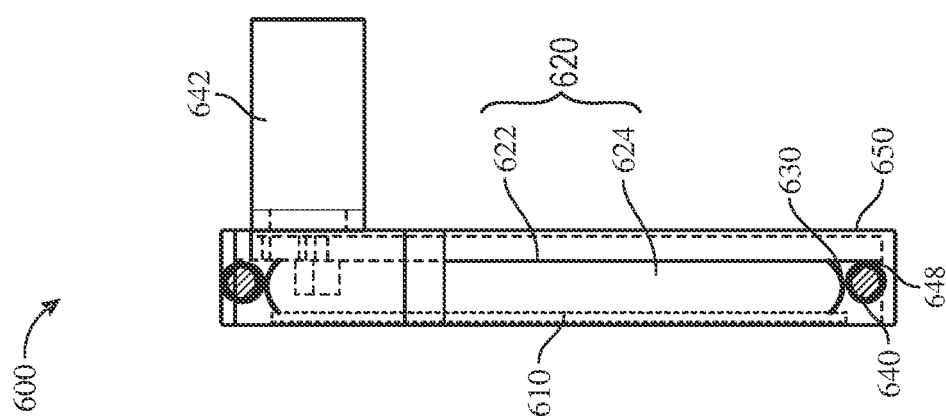
FIG. 8 is a cross-sectional side view of an optical lens assembly according to an embodiment of the present disclosure.

As illustrated in FIGS. 8 and 9, a proximal end of the actuator component 640 may be operatively coupled to an actuator 642, such as an electromechanical motor with a rotatable spool 644, for actuation. A distal end of the actuator component 640 may be coupled to the housing 650 via an attachment structure 646 (FIG. 9).

As shown in each of FIGS. 6-9, at least a portion of the actuator component 640 may pass through one or more rigid or semi-rigid sheaths 648. The sheaths 648 may provide a physical barrier between at least portions of the actuator component 640 and the compliant peripheral component 630, such as to protect the compliant peripheral component 630 from wear that might otherwise result from sliding friction upon repeated actuation. In addition, the sheaths 648 may be positioned to provide points or sections where a radially inward actuation force 660 (FIG. 7) may be applied against the compliant peripheral component 630, such as to induce a specific deformation profile of the deformable optical element 620. The sheaths 648 may be radially movable relative to the housing 650.

Figure 7:
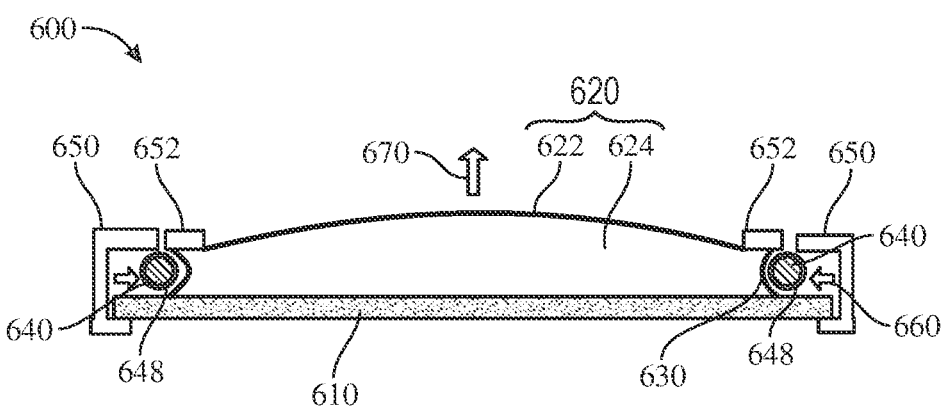
FIG. 7 is a cross-sectional side view of the optical lens assembly of FIG. 6 in an actuated state.

As illustrated in FIG. 7, actuation of the optical lens assembly 600 may result in application of the actuation force 660 by the actuator component 640 and sheaths 648 against the compliant peripheral component 630. As the compliant peripheral component 630 is forced inward, portions of the deformable medium 624 may be displaced inward and a central portion of the deformable optical element 620 may axially (i.e., in a direction of an optical axis of the optical lens assembly 600) bulge outward, as shown by arrow 670 in FIG. 7.

Figure 10:
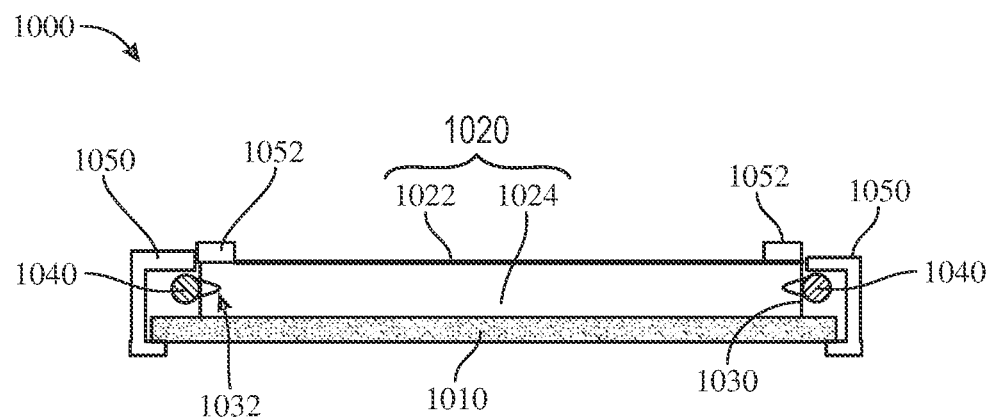
FIG. 10 is a cross-sectional side view of an optical lens assembly in a neutral, non-actuated state, according to an embodiment of the present disclosure.
Figure 11:
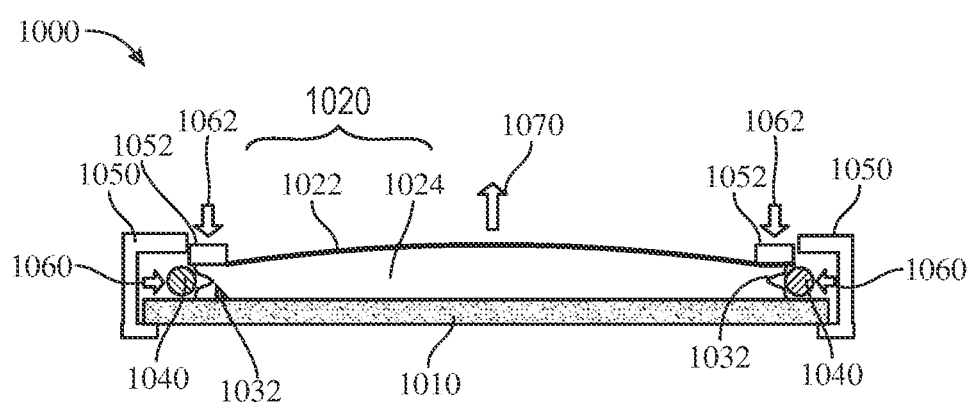
FIG. 11 is a cross-sectional side view of the optical lens assembly of FIG. 10 in an actuated state.

FIGS. 10 and 11 show another embodiment of an optical lens assembly 1000. The optical lens assembly 1000 may include a substantially transparent, rigid or semi-rigid structural support element 1010, a deformable optical element 1020 (including a deformable element 1022 and a deformable medium 1024), and a compliant peripheral component 1030 positioned between peripheral portions of the structural support element 1010 and the deformable element 1022. An elongated actuator component 1040 may be positioned around at least a portion of a perimeter of the compliant peripheral component 1030. A housing 1050 may support the other components of the optical lens assembly 1000. A pre-tensioning ring 1052 may be coupled to a peripheral portion of the deformable element 1022 to maintain an applied pre-tension and initial mechanical stress in the deformable element 1022.

In this example, the compliant peripheral component 1030 may include an inward protrusion 1032 that may axially collapse when the actuator component 1040 applies a radially inward actuation force 1060 (FIG. 11) against the compliant peripheral component 1030. Upon actuation, the pre-tensioning ring 1052 and a corresponding peripheral portion of the deformable optical element 1020 may be displaced in a direction 1062 toward the structural support element 1010 (e.g., in a downward direction in the perspective of FIG. 11). A radially outer portion of the deformable medium 1024 may be displaced inward, resulting in the deformable element 1022 bulging away from the structural support element 1010, as shown in FIG. 11 by arrow 1070, to alter at least one optical property of the optical lens assembly 1000.

Figure 12:
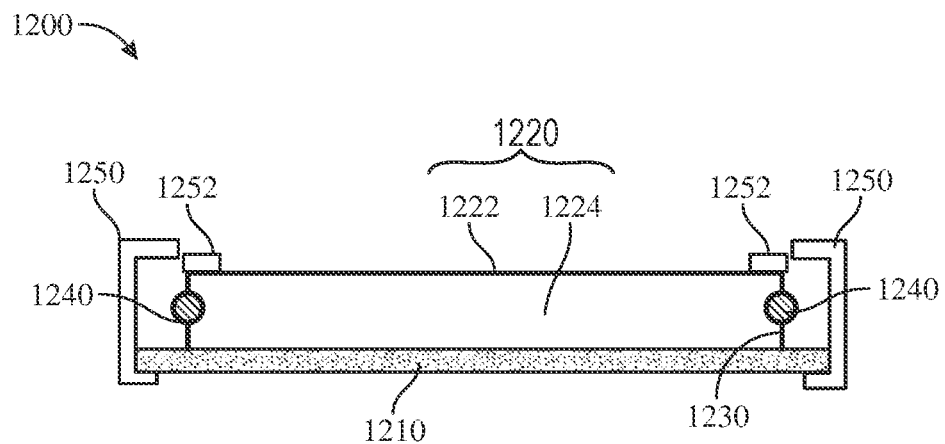
FIG. 12 is a cross-sectional side view of an optical lens assembly in a neutral, non-actuated state, according to an embodiment of the present disclosure.
Figure 13:
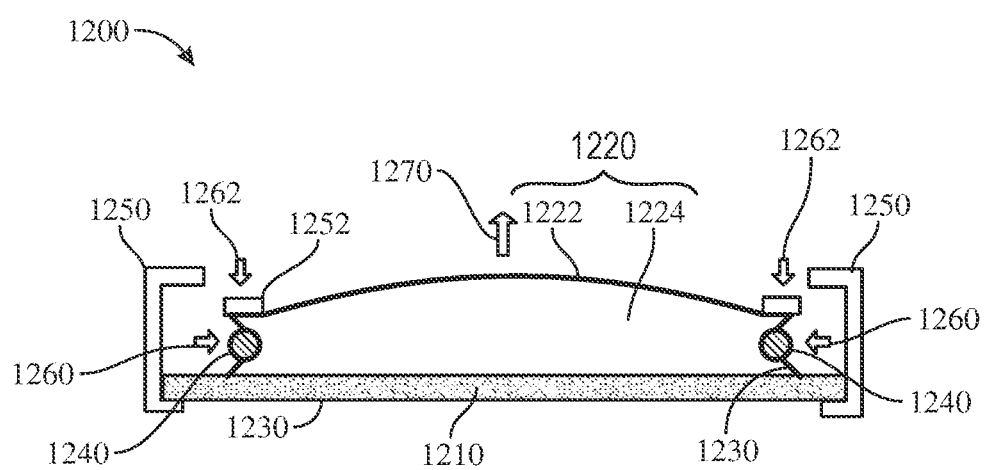
FIG. 13 is a cross-sectional side view of the optical lens assembly of FIG. 12 in an actuated state.

FIGS. 12 and 13 illustrate an optical lens assembly 1200 according to another embodiment of this disclosure. The optical lens assembly 1200 may include a substantially transparent, rigid or semi-rigid structural support element 1210, a deformable optical element 1220 (including a deformable element 1222 and a deformable medium 1224), and a compliant peripheral component 1230 positioned between peripheral portions of the structural support element 1210 and the deformable element 1222. An elongated actuator component 1240 may be positioned and configured to actuate the deformable optical element 1220 to alter at least one optical property of the optical lens assembly 1200. A housing 1250 may support the other components of the optical lens assembly 1200. A pre-tensioning ring 1252 may be coupled to a peripheral portion of the deformable element 1222 to maintain an applied pre-tension and initial mechanical stress in the deformable element 1222.

In this example, the actuator component 1240 may be substantially fully surrounded by portions of the compliant peripheral component 1230. For example, the actuator component 1240 may be over-molded or otherwise encased by a material of the compliant peripheral component 1230. The actuator component 1240 may be capable of longitudinally sliding within the material of the compliant peripheral component 1230, and/or the material of the compliant peripheral component 1230 may be sufficiently elastic to stretch and/or compress upon actuation and inward displacement of the compliant peripheral component 1230. By way of example, the actuator component 1240 may be or include a loop of a shape-memory alloy that may be configured to shorten in length upon application of sufficient electrical energy (e.g., a voltage).

As illustrated in FIG. 13, inward displacement of the actuator component 1240 may apply an inward actuation force 1260 on the compliant peripheral component 1230, which may result in the pre-tensioning ring 1252 and corresponding peripheral portion of the deformable element 1222 moving in a direction 1262 toward the structural support element 1210 (e.g., downward in the perspective of FIG. 13). Outer portions of the deformable medium 1224 may be displaced radially inward, resulting in an outward bulge of a central portion of the deformable optical element 1220, as shown by arrow 1270 in FIG. 13.

Figure 14:
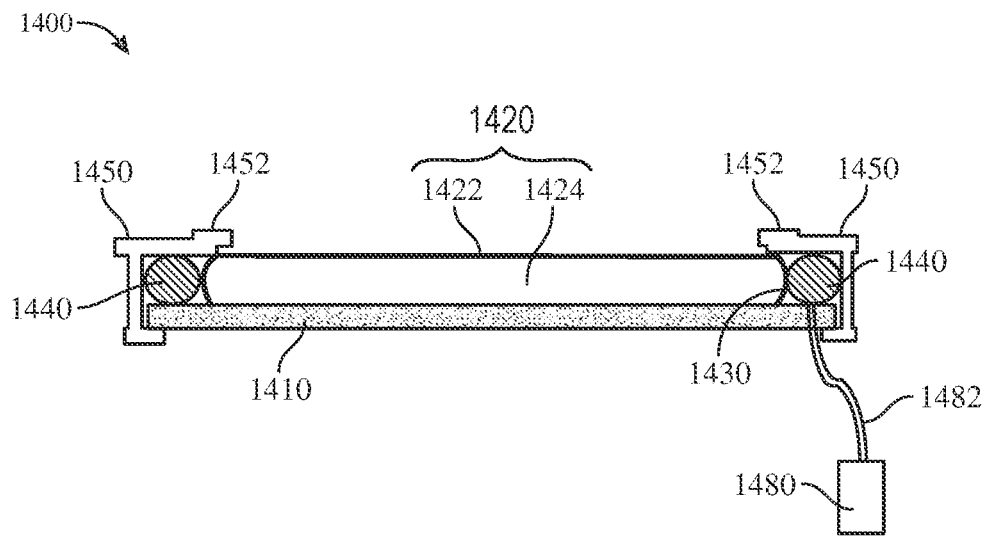
FIG. 14 is a cross-sectional side view of an optical lens assembly in a neutral, non-actuated state, according to an embodiment of the present disclosure.
Figure 15:
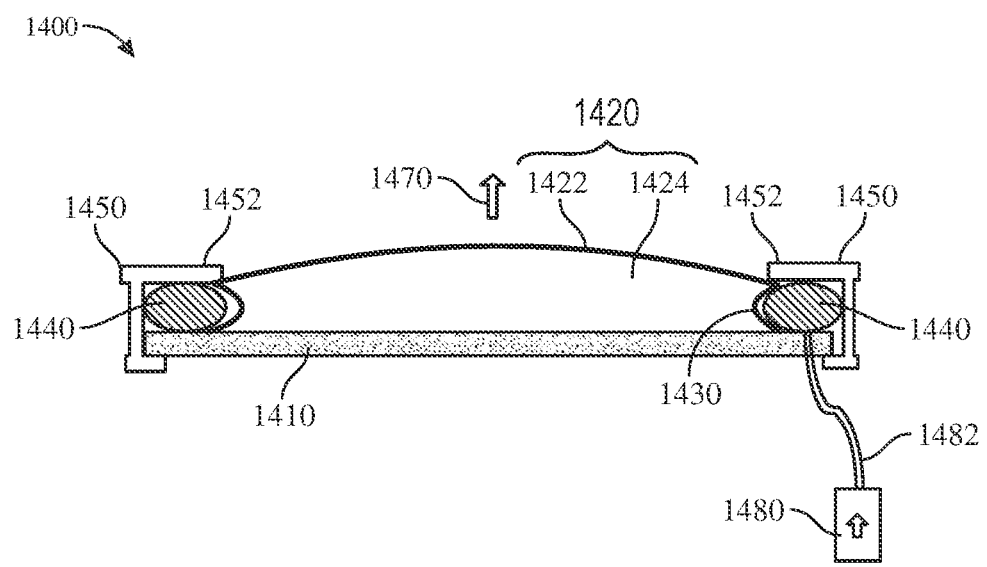
FIG. 15 is a cross-sectional side view of the optical lens assembly of FIG. 14 in an actuated state.

FIGS. 14 and 15 show another embodiment of an optical lens assembly 1400. The optical lens assembly 1400 may include a substantially transparent, rigid or semi-rigid structural support element 1410, a deformable optical element 1420 (including a deformable element 1422 and a deformable medium 1424), and a compliant peripheral component 1430 positioned between peripheral portions of the structural support element 1410 and the deformable element 1422. An elongated actuator component 1440 may be positioned around a perimeter of the compliant peripheral component 1430, and may be configured to actuate the deformable optical element 1420 to alter at least one optical property of the optical lens assembly 1400. A housing 1450 may support the other components of the optical lens assembly 1400. A pre-tensioning ring 1452, which may be a portion of the housing 1450, may be coupled to a peripheral portion of the deformable element 1422 to maintain an applied pre-tension and initial mechanical stress in the deformable element 1422.

In this example, the actuator component 1440 may include an expansible fluid-filled bladder. An actuator 1480 may be configured to apply a pressure to the fluid within the actuator component 1440. For example, the actuator 1480 may be a pump or piston that may be in fluid communication with an interior of the actuator component 1440, such as via a conduit 1482.

As shown in FIG. 15, when a pressure is increased within the actuator component 1440 by actuation of the actuator 1480, the actuator component 1440 may expand. In some embodiments, the actuator component 1440 may be constrained in an axial direction (i.e., in a direction of an optical axis of the optical lens assembly 1400) by the housing 1450. Accordingly, expansion of the actuator component 1440 may displace an inner portion of the actuator component 1440 inward to apply an actuation force against the compliant peripheral component 1430, which may result in a central portion of the deformable optical element 1420 bulging outward, as shown by arrow 1470 in FIG. 15. Upon release of the pressure from the actuator 1480, the actuator component 1440 may relax and the optical lens assembly 1400 may return to the non-actuated state illustrated in FIG. 14.

In additional embodiments, the expansible actuator component 1440 may be coupled (e.g., bonded, adhered) to the structural support element 1410 and to the deformable element 1422, and a separate compliant peripheral component 1430 may be absent. In such embodiments, an inner sidewall of the actuator component 1440 may form a compliant peripheral component that may deform inward upon actuation.

Figure 16:
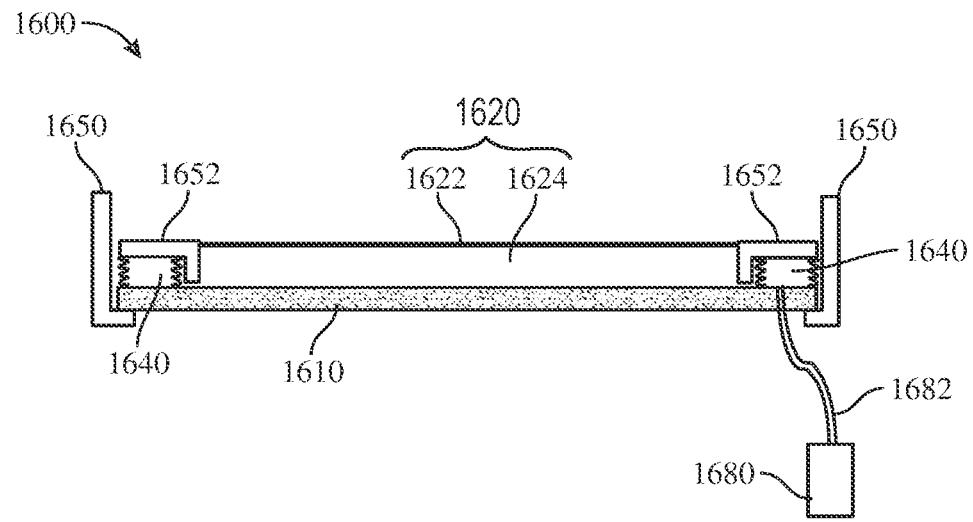
FIG. 16 is a cross-sectional side view of an optical lens assembly in a neutral, non-actuated state, according to an embodiment of the present disclosure.
Figure 17:
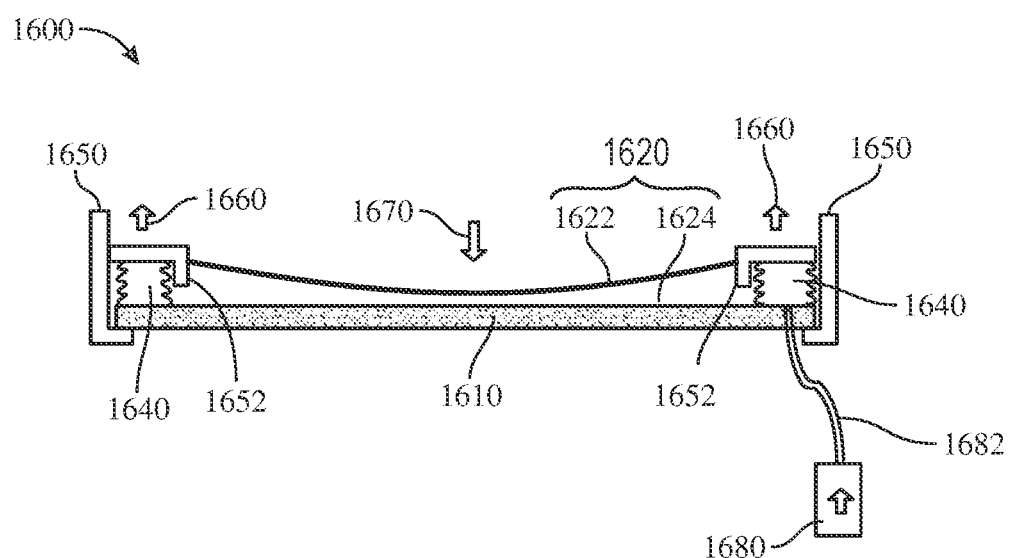
FIG. 17 is a cross-sectional side view of the optical lens assembly of FIG. 16 in an actuated state.

FIGS. 16 and 17 illustrate an optical lens assembly 1600 according to another embodiment of this disclosure. The optical lens assembly 1600 may include a substantially transparent, rigid or semi-rigid structural support element 1610, a deformable optical element 1620 (including a deformable element 1622 and a deformable medium 1624), and a compliant peripheral component 1640 positioned between peripheral portions of the structural support element 1610 and the deformable element 1622. The compliant peripheral component 1640 may be configured to be actuated to deform the deformable optical element 1620 to alter at least one optical property of the optical lens assembly 1600. The compliant peripheral component 1640 may define an edge seal for containing the deformable medium 1624 within a cavity defined between the structural support element 1610 and the deformable element 1622. A housing 1650 may support the other components of the optical lens assembly 1600. A pre-tensioning ring 1652 may be coupled to a peripheral portion of the deformable element 1622 to maintain an applied pre-tension and initial mechanical stress in the deformable element 1622.

In this example, the compliant peripheral component 1640 may be or include a hydraulically actuated, expanding bellows, which may be configured to expand upon actuation and contract upon release, such as in a direction along an optical axis of the optical lens assembly 1600. An actuator 1680 (e.g., a pump, a piston) may be in fluid communication with an interior of the compliant peripheral component 1640, such as via a conduit 1682.

As illustrated in FIG. 17, when fluid pressure is applied to an interior of the compliant peripheral component 1640 by the actuator 1680, the compliant peripheral component 1640 may expand, forcing the pre-tensioning ring 1652 and a peripheral portion of the deformable element 1622 away from the structural support element 1610, as shown by arrows 1660 in FIG. 17. In this example, portions of the compliant peripheral component 1640 may be displaced in a direction along an optical axis of the optical lens assembly

1600. Portions of the deformable medium 1624 in a central region of the deformable optical element 1620 may be displaced outward toward the compliant peripheral component 1640, and a central portion of the deformable optical element 1620 may be depressed toward the structural support element 1610, as shown by arrow 1670 in FIG. 17. In this actuated state, the optical lens assembly 1600 may have a concave shape exhibiting a negative-optical power. In addition, if a fluid pressure within the compliant peripheral component 1640 is reduced, such as by withdrawing fluid therefrom by the actuator 1680, the compliant peripheral component 1640 may shorten and the optical lens assembly 1600 may have a convex shape exhibiting a positive-optical power.

Figure 18:
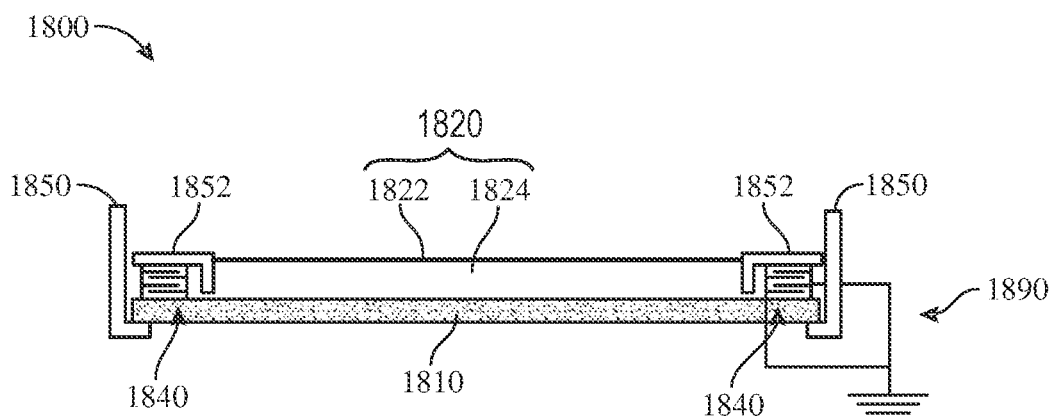
FIG. 18 is a cross-sectional side view of an optical lens assembly in a neutral, non-actuated state, according to an embodiment of the present disclosure.
Figure 19:
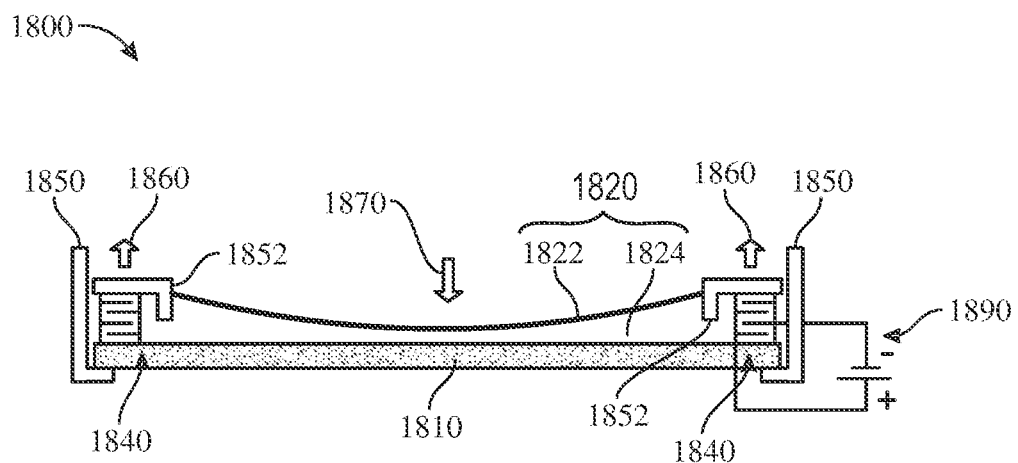
FIG. 19 is a cross-sectional side view of the optical lens assembly of FIG. 18 in an actuated state.

FIGS. 18 and 19 show another embodiment of an optical lens assembly 1800. The optical lens assembly 1800 may include a substantially transparent, rigid or semi-rigid structural support element 1810, a deformable optical element 1820 (including a deformable element 1822 and a deformable medium 1824), and a compliant peripheral component 1840 positioned between peripheral portions of the structural support element 1810 and the deformable element 1822. The compliant peripheral component 1840 may be configured to be actuated to deform the deformable optical element 1820 to alter at least one optical property of the optical lens assembly 1800. The compliant peripheral component 1840 may define an edge seal for containing the deformable medium 1824 within a cavity defined between the structural support element 1810 and the deformable element 1822. A housing 1850 may support the other components of the optical lens assembly 1800. A pre-tensioning ring 1852 may be coupled to a peripheral portion of the deformable element 1822 to maintain an applied pre-tension and initial mechanical stress in the deformable element 1822.

In this example, the compliant peripheral component 1840 may include a stack of multiple electroactive materials and interdigitated electrodes. The electroactive materials may be configured to deform (e.g., expand or contract) upon application of a sufficient voltage to the electrodes by a driver circuit 1890. Therefore, the driver circuit 1890 may act as an actuator. By way of example, the electroactive materials of the compliant peripheral component 1840 may include piezoelectric materials, electrostrictor materials, dielectric elastomers, and ionic polymer conductors. By way of example, the electroactive materials may include piezoelectrics including polymers like polyvinylidene fluoride ("PVDF") and its copolymers, and/or single crystal ceramics like lithium niobite, quartz, $K_{0.5}Na_{0.5}NbO_3$ ("KNN"), barium titanate, lithium niobate, lithium tetraborate, quartz, lead zirconate titanate, $Pb(Mg_{1/3}Nb_{2/3})O_3$—$PbTiO_3$, and/or $Pb(Zn_{1/3}Nb_{2/3})O_3$—$PbTiO_3$, etc.

The electrodes of the compliant peripheral component 1840 may include a conductive material, such as a metallic material, a transparent conducting oxide, indium tin oxide, a nanocomposite material, carbon nanotubes, silver nanowires, and/or graphene, for example.

FIG. 19 illustrates the optical lens assembly 1800 in an actuated state. For example, application by the driver circuit 1890 of a sufficient voltage and polarity on the electroactive stack of the compliant peripheral component 1840 may expand the compliant peripheral component 1840 to apply an actuation force 1860 on the pre-tensioning ring 1852 away from the structural support element 1810. In this example, portions of the compliant peripheral component 1840 may be displaced in a direction along an optical axis of the optical lens assembly 1800. Actuation in this manner may result in a central region of the deformable optical element 1820 deforming toward the structural support element 1810 to result in a concave shape, as shown by arrow 1870 in FIG. 19. Conversely, the application by the driver circuit 1890 of a sufficient voltage of an opposite polarity may cause the compliant peripheral component 1840 to shorten and the deformable optical element 1820 to form a convex shape.

Figure 20:
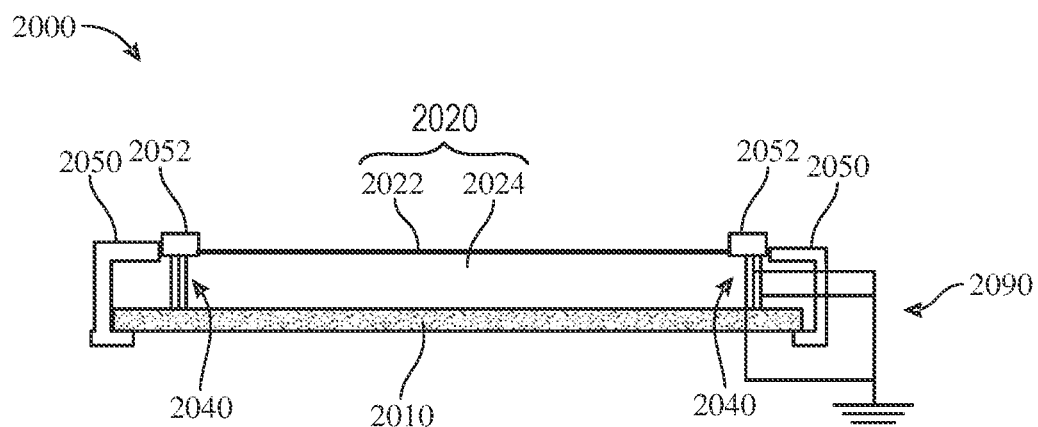
FIG. 20 is a cross-sectional side view of an optical lens assembly in a neutral, non-actuated state, according to an embodiment of the present disclosure.
Figure 21:
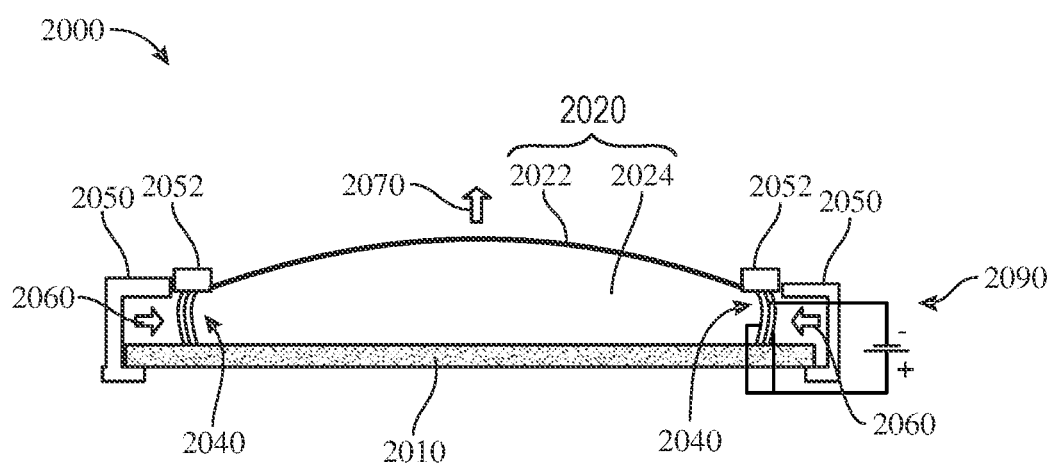
FIG. 21 is a cross-sectional side view of the optical lens assembly of FIG. 20 in an actuated state.

FIGS. 20 and 21 show another embodiment of an optical lens assembly 2000. The optical lens assembly 2000 may include a substantially transparent, rigid or semi-rigid structural support element 2010, a deformable optical element 2020 (including a deformable element 2022 and a deformable medium 2024), and a compliant peripheral component 2040 positioned between peripheral portions of the structural support element 2010 and the deformable element 2022. The compliant peripheral component 2040 may be configured to be actuated to deform the deformable optical element 2020 to alter at least one optical property of the optical lens assembly 2000. The compliant peripheral component 2040 may define an edge seal for containing the deformable medium 2024 within a cavity defined between the structural support element 2010 and the deformable element 2022. A housing 2050 may support the other components of the optical lens assembly 2000. A pre-tensioning ring 2052 may be coupled to a peripheral portion of the deformable element 2022 to maintain an applied pre-tension and initial mechanical stress in the deformable element 2022.

In this example, the compliant peripheral component 2040 may include a single electroactive material or a stack of multiple electroactive materials and electrodes. The electroactive material(s) may be configured to deform inward and/or outward upon application of a sufficient voltage to the electrodes by a driver circuit 2090, as illustrated in FIG. 21. In embodiments including a stack of multiple electroactive materials, the electroactive materials and electrodes may be arranged to be driven by either a parallel driver circuit 2090 (as shown in FIG. 21) or a series driver circuit.

As illustrated in FIG. 21, application of a sufficient voltage by the driver circuit 2090 may cause at least a portion of the compliant peripheral component 2040 to bend radially inward, which may impose an inward actuation force 2060 on an outer portion of the deformable medium 2024, resulting in a central portion of the deformable optical element 2020 bulging to form a convex shape, as shown by arrow 2070 in FIG. 21. Conversely, application of a sufficient voltage of an opposite polarity may result in the complaint peripheral component 2040 bending outward, causing the deformable optical element 2020 to have a concave shape.

FIG. 22 is a flow diagram that illustrates a method 2200 of altering at least one optical property of an optical lens assembly. In operation 2210, a portion of a compliant peripheral component, which may be positioned between peripheral portions of a deformable element and of a structural support element, may be displaced, such as with an actuator. The actuator may, in some examples, displace a portion of the compliant peripheral component in a direction that is along an optical axis, or that is orthogonal to the optical axis (e.g., radially inward) of the optical lens assembly. For example, the actuator may act directly on the compliant peripheral component, rather than or in addition to on a major surface of the deformable element. Thus, actuation and deformation of the optical lens assembly may be initiated by an actuator interacting directly with (e.g., physically and/or electrically interacting with) the compliant peripheral component.

Referring to operation 2220, as a result of the displacement of the compliant peripheral component, the deformable element may be deformed to change at least one optical property of the optical lens assembly. For example, as discussed above, an actuation force acting on or through the compliant peripheral component may change a fluid pressure in a peripheral portion of a deformable medium between the deformable element and the structural support element, which may result in a central region of the deformable element bulging into a convex shape and/or depressing into a concave shape. Thus, at least a portion of the deformable medium may be displaced within the cavity, and a pressure within the cavity may be altered to deform the deformable element.

Accordingly, disclosed are optical lens assemblies and associated HMDs that include a compliant peripheral component that may be displaced by an actuator to change at least one optical property of the optical lens assemblies or HMDs. Related methods for altering at least one optical property of optical lens assemblies are also disclosed. The disclosed apparatuses and methods may enable improved optical lens assemblies with alternative actuation schemes and mechanisms, such as with reduced actuator sizes, reduced housing thickness, reduced actuation forces, and/or altered deformation profiles.

Embodiments of the present disclosure may include or be implemented in conjunction with an artificial reality system. Artificial reality is a form of reality that has been adjusted in some manner before presentation to a user, which may include, e.g., VR, AR, mixed reality (MR), hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications, combinations, and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical lens assembly, comprising:
    a deformable element including a substantially transparent deformable medium and a compliant peripheral component; and
    at least one electromechanical actuator configured to displace at least a portion of the compliant peripheral component to deform the deformable element and change at least one optical property of the optical lens assembly, wherein the at least one electromechanical actuator is configured to tension a cable to apply a force with the cable to the compliant peripheral component.

2. The optical lens assembly of claim 1, wherein the electromechanical actuator comprises an electric motor.

3. The optical lens assembly of claim 1, wherein the electromechanical actuator comprises a linear actuator.

4. The optical lens assembly of claim 1, wherein at least a portion of the cable is housed within at least one sheath.

5. The optical lens assembly of claim 1, wherein at least a portion of the cable is unsheathed.

6. The optical lens assembly of claim 1, further comprising a driver circuit configured to apply a voltage to the electromechanical actuator.

7. The optical lens assembly of claim 1, wherein at least a portion of the cable is encased by a material of the compliant peripheral component.

8. The optical lens assembly of claim 1, wherein the electromechanical actuator comprises a spool and at least a portion of the cable is wrapped at least partially around the spool.

9. The optical lens assembly of claim 1, further comprising a housing configured to support the deformable element, wherein a proximal longitudinal end of the cable is coupled to the electromechanical actuator and a distal longitudinal end of the cable is coupled to the housing.

10. The optical lens assembly of claim 9, wherein the housing comprises at least one of an augmented-reality eyeglass frame or a virtual-reality headset frame.

11. The optical lens assembly of claim 1, further comprising a structural support element to which the compliant peripheral component is mounted.

12. The optical lens assembly of claim 1, wherein the deformable element is under an initial mechanical stress prior to actuation by the actuator, further comprising a pre-tensioning ring coupled to a perimeter of the deformable element, wherein the initial mechanical stress in the deformable element is held by the pre-tensioning ring.

13. The optical lens assembly of claim 1, wherein the compliant peripheral component and the electromechanical actuator are positioned outside of a substantially transparent aperture of the optical lens assembly.

14. The optical lens assembly of claim 1, wherein the electromechanical actuator is configured to cause the deformable element to deform, via displacement of at least a portion of the compliant peripheral component, into at least one of a substantially convex shape or a substantially concave shape.

15. The optical lens assembly of claim 1, wherein the compliant peripheral component comprises a bi-stable element.

16. The optical lens assembly of claim 1, wherein at least a portion of the compliant peripheral component serves as an edge seal for at least a portion of a cavity containing the substantially transparent deformable medium.

17. The optical lens assembly of claim 1, wherein the substantially transparent deformable medium comprises at least one of a liquid, a gas, a gel, a foam, or a polymer.

18. A head-mounted display, comprising:
   a support housing;
   an optical lens assembly coupled to the support housing, the optical lens assembly comprising:
      a deformable element including a substantially transparent deformable medium positioned and a compliant peripheral component; and
      an electromechanical actuator configured to displace at least a portion of the compliant peripheral component to deform the deformable element and change at least one optical property of the optical lens assembly by tensioning a cable to apply a force with the cable to the compliant peripheral component; and
   a display element coupled to the support housing.

19. A method of altering at least one optical property of an optical lens assembly, comprising:
   tensioning a cable with an electromagnetic actuator;
   displacing, as a result of tensioning the cable, at least a portion of a compliant peripheral component of a deformable optical element; and
   deforming, as a result of the displacement of the compliant peripheral component, the deformable optical element to change at least one optical property of the optical lens assembly.

20. The method of claim 19, wherein tensioning the cable with the electromagnetic actuator comprises wrapping a portion of the cable at least partially around a spool of the electromagnetic actuator.

* * * * *